No. 879,874. PATENTED FEB. 25, 1908.
F. B. HOWARD & A. RECTOR.
ADJUSTABLE MANTLE SUPPORT.
APPLICATION FILED JULY 11, 1906.
3 SHEETS—SHEET 1.
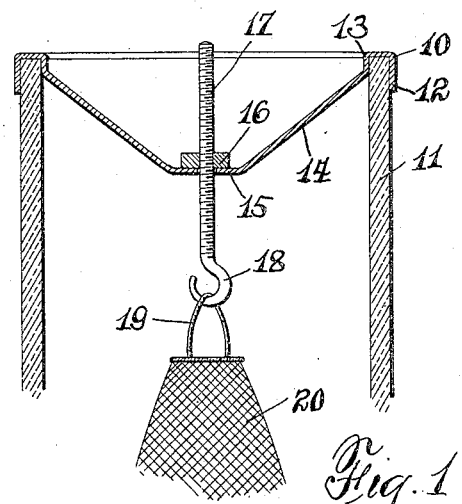
Fig. 1
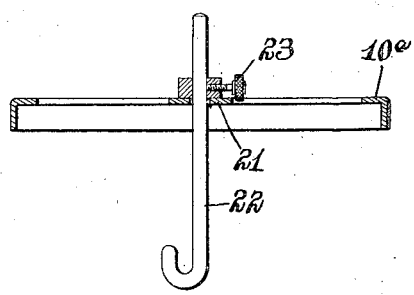
Fig. 2
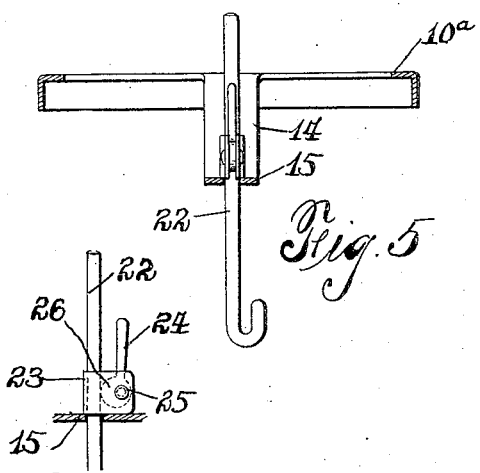
Fig. 5
Fig. 6
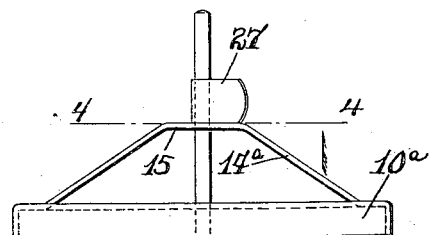
Fig. 3
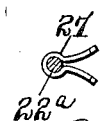
Fig. 4
WITNESSES:
A. A. Phipps
Frank L. Stubbs
INVENTORS
Frank B. Howard and
Alcorn Rector
BY
W. B. Hutchinson,
ATTORNEY No. 879,874. PATENTED FEB. 25, 1908.
F. B. HOWARD & A. RECTOR.
ADJUSTABLE MANTLE SUPPORT.
APPLICATION FILED JULY 11, 1906.

3 SHEETS—SHEET 2.

WITNESSES:
A. A. Phipps.
Frank L. Stubbs.

INVENTORS.
Frank B. Howard
and Alcorn Rector
BY
W. B. Hutchinson,
ATTORNEY

No. 879,874. PATENTED FEB. 25, 1908.
F. B. HOWARD & A. RECTOR.
ADJUSTABLE MANTLE SUPPORT.
APPLICATION FILED JULY 11, 1906.

3 SHEETS—SHEET 3.

WITNESSES:
A. N. Phipps
Frank L. Stubbs

INVENTORS
Frank B. Howard and
Alvin Rector
BY
W. B. Hutchinson
ATTORNEY.

UNITED STATES PATENT OFFICE.

FRANK B. HOWARD AND ALCORN RECTOR, OF NEW YORK, N. Y., ASSIGNORS TO RECTOR GAS LAMP COMPANY, OF NEW YORK, N. Y., A CORPORATION OF CONNECTICUT.

ADJUSTABLE MANTLE-SUPPORT.

No. 879,874.  Specification of Letters Patent.  Patented Feb. 25, 1908.

Application filed July 11, 1906. Serial No. 325,673.

*To all whom it may concern:*

Be it known that we, FRANK B. HOWARD and ALCORN RECTOR, of the city, county, and State of New York, have invented a new and Improved Adjustable Mantle-Support, of which the following is a full, clear, and exact description.

Our invention relates to improvements in that class of mantle supports which are used in connection with incandescent gas lamps. It is desirable to support a mantle from the chimney top, or some top part of the lamp structure, so that no shadow will be thrown, and in practice it is often found very desirable to adjust the mantle vertically. For instance, by such an adjustment, if the lower part of the mantle is broken at the burner, as is sometimes the case, instead of throwing away the mantle, a vertical adjustment permits it to be lowered so that it does as good service as ever, and for a considerable period of time. Moreover, the vertical adjustment enables the mantle to be brought into just the right position for the most effective use. In providing for this vertical adjustment we can support the mantle from a point directly above it and by means extending across the chimney top, or we can support it from a structure carried on the chimney and at one side of the mantle, so that in case the lamp leans a little to one side the point of suspension can be adjusted with reference to this leaning so as to get the mantle in the desired position.

With these ends in view our invention consists of certain features of construction and combinations of parts which will be hereinafter described and claimed.

Reference is to be had to the accompanying drawings forming a part of this specification, in which similar letters and figures of reference indicate corresponding parts in all the views.

Figures 7, 8:
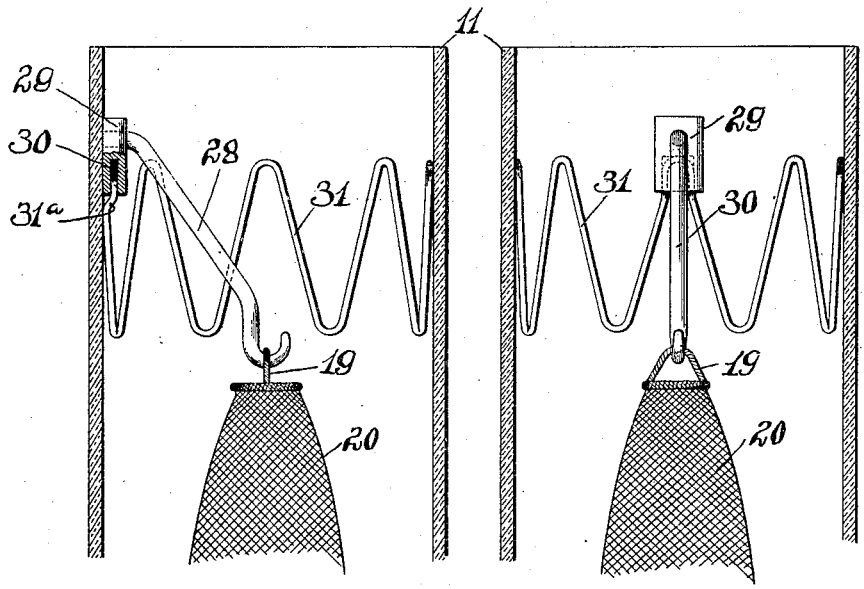
Figures 9, 10, 11:
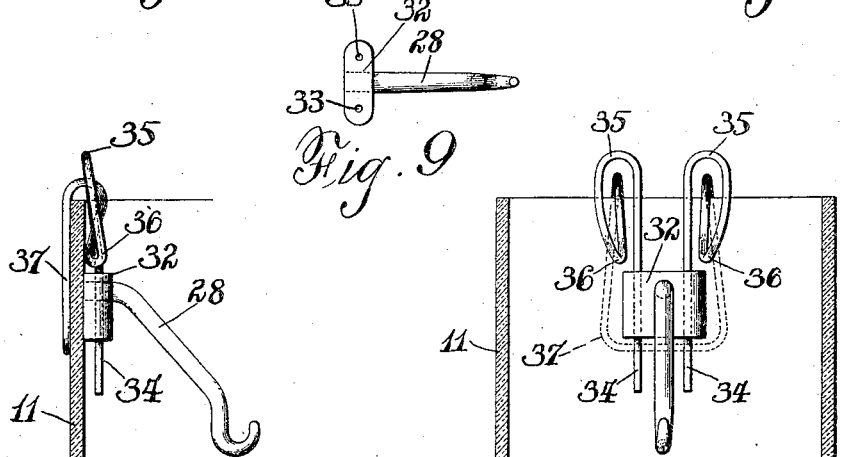
Figure 13:
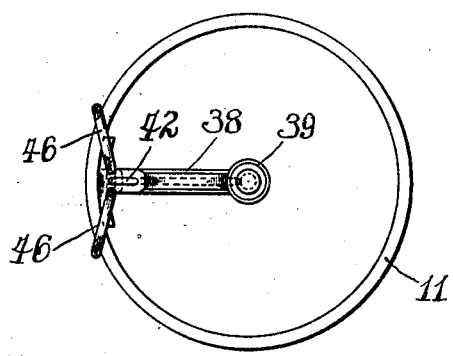
Figure 14:
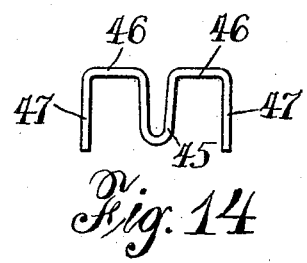
Figure 12:
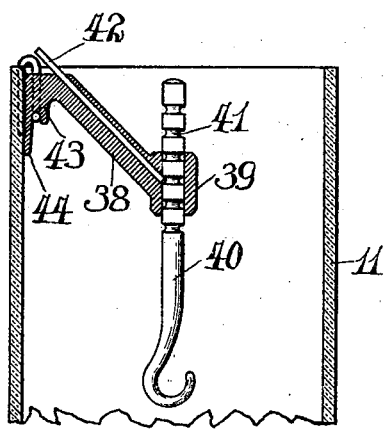
Figure 15:
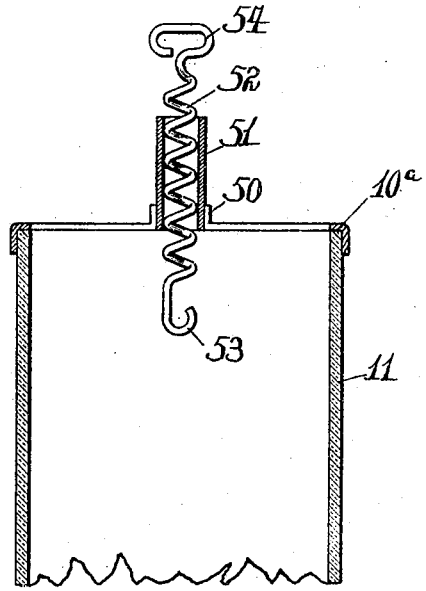

Figure 1 is a central vertical section of a mantle support embodying our improvement showing the same attached to a mantle. Fig. 2 is a detail sectional view of a modified form of the support. Fig. 3 is a detail side elevation of another modification showing a device which is practically the inversion of the structure shown in Fig. 1. Fig. 4 is an inverted sectional plan on the line 4—4 of Fig. 3. Fig. 5 is a detail cross section showing a modification in which the suspension hook is held by a lever. Fig. 6 is a detail of the structure shown in Fig. 5. Fig. 7 shows a modification in which the parts which carry the hook are adjustable in a chimney. Fig. 8 is a view taken at right angles to that shown in Fig. 7. Fig. 9 is a detail plan of a hook such as is used in the structure shown in Figs. 10 and 11. Figs. 10 and 11 are details showing in side and front elevation, a modification in which the bracket is movable up and down on the side of the chimney. Fig. 12 is a detail sectional view on the line 12—12 of Fig. 13, a form of the device in which the hook is suspended from the chimney side, but is adjustable vertically in its supporting bracket. Fig. 13 is a plan view of the structure shown in Fig. 12. Fig. 14 is a detail of the spring support shown in Figs. 12 and 13, and Fig. 15 shows another modification providing for the vertical adjustment of the suspension hook.

We have shown all the modifications referred to to emphasize the fact that we claim broadly the structure which permits the vertical adjustment of the mantle support, and particularly which permits such adjustment from a point above the mantle.

Referring to Fig. 1 the ring 10 which seats on the chimney top 11 may be of any suitable shape which fits the chimney and does not slip and to prevent displacement it has preferably an exterior flange 12 and interior flanges 13 which are a part of the depressed cross bar 14 and this is preferably flattened near the center, as shown at 15, so as to extend in a practical horizontal plane. This section supports a nut 16 in which fits the screw threaded shank 17 of the hook 18 and the latter engages the loop 19 of the mantle 20. It will be seen that by adjusting the hook up and down in the nut the height of the mantle can be nicely regulated.

As shown in Fig. 2 the ring $10^a$ is of angle metal so as to fit the chimney top and it has a cross bar 21 pierced in the middle to receive a suspension hook 22 which is adapted to engage the mantle loop 19 and the hook 22 can be fastened in a desired position by a set screw 23.

In Figs. 3 and 4 we have shown the ring $10^a$ carrying a cross bar $14^a$ having the flat part 15 above referred to, but the cross bar instead of being depressed is elevated, as shown, and it supports the spring clip 27 which frictionally engages the hook $22^a$ and permits the latter to be adjusted.

In Figs. 5 and 6 the hook 22 is supported in a cross bar like that shown in Fig. 1, but the fastening is by means of a lever 24, which is held in a clip 23, thus embracing the hook 22 and resting on the part 15 of the cross bar 14, and the lever 24 is pivoted as at 25 and has a cam end 26 which by impinging on the shank 22 fastens the hook in a desired position.

In Figs. 7 to 14 we have shown a side suspension for the hook which carries the mantle and in some cases this is desirable, and particularly in case that the lamp fixture leans more or less, although this structure can be used wherever desired. As shown in Figs. 7 and 8, we show a laterally extending hook 28 to engage the mantle loop and this is secured to a bracket base 29 having in the under side a slot 30 which is adapted to be seated on the points of a zig-zag wire ring 31 which fits snugly in the chimney, and the friction of which on the sides of the chimney is sufficient to support it in place. The points of the ring can at the top be bent in as at 31ª in Fig. 7 so that the bracket base 29 can be seated easily thereon. In this case the vertical adjustment is effected by simply moving the ring 31 up or down in the chimney.

In Figs. 9 to 11 the hook 28 has a base 32 with vertical holes 33 therein which receive the spring members 34 of a supporting bracket in the form of a spring clip and these members 34 can be arranged so that their tension either towards or away from each other shall be sufficient to prevent the bracket base 32 from sliding off. The bracket shown in Figs. 10 and 11 can be slipped on over the edge of the chimney top and to this end the wire forming it is bent inwardly and downwardly at the top of the members 34, as shown at 35, then bent in and returned upon itself, as shown at 36, and finally doubled over the chimney top and extending down in the form of a terminal loop 37. Thus the bracket has a spring grip on the chimney top and it can be placed in position by simply slipping it on so that the chimney is grasped between the parts 36 and 37 (see Fig. 10) and the resiliency of the spring bracket permits it to adjust itself to the curvature of the chimney.

In Figs. 12 and 13 we have shown a laterally extending arm 38 to support a hook, and to this end the inner end of the arm has a hollow vertically arranged bearing 39 through which moves the hook 40, and the hook is provided with a series of grooves 41 which are adapted to receive the fastening pin 42 which extends longitudinally through the arm 38 and thus by regulating the pin with relation to a particular groove the hook 40 can be adjusted vertically. It will be obvious that other means can be used for fastening the hook 40 and that the special fastening devices which we have shown and described can be in many cases substituted one for the other, or other fastenings used without affecting the principle of the invention. The arm 38 is carried by a bracket base 43 which is elongated at the back, as shown at 44 to give it a better bearing surface on the chimney 11, and the base can be supported in any convenient way. We prefer the way illustrated, in which we show the base grooved to receive the loop 45 of the bracket 46, this loop extending down within the chimney while the bracket has also depending arms 47 which extend down the outside of the chimney and so the base is held firmly to the chimney by the spring bracket.

In Fig. 15 we have shown still another form of adjustment which is more like those shown in Figs. 1 to 6 in that the suspension hook is held from a point directly above the mantle. As here shown the ring 10ª has a cross bar 50 carrying a thimble 51 in which is held frictionally the spiral shank 52 of the hook 53 which is adapted to engage the loop 19 of the mantle, and which for convenience, is provided with a handle 54 at the top.

Having thus fully described our invention, we claim as new and desire to secure by Letters Patent,—

1. The combination with an incandescent gas lamp, of a clip to grip the chimney top, said clip having opposed members, a bracket slidable up and down on the said opposed members, and a mantle engaging hook carried by the bracket.

2. The combination with an incandescent lamp, of means engaging the chimney top, a bracket engaging said means, and a mantle engaging hook carried by the bracket.

3. The combination with an incandescent gas lamp, of a clip to grip the chimney top, said clip having opposed members, a bracket slidable up and down on the said opposed members, the tension of the members one with relation to the other being sufficient to prevent the bracket from sliding off the clips, and a mantle engaging hook carried by the bracket.

FRANK B. HOWARD.
ALCORN RECTOR.

Witnesses:
WARREN B. HUTCHINSON,
MARY A. S. MOELLER.